United States Patent [19]
Schwarz

[11] 3,815,695
[45] June 11, 1974

[54] SCALE BEAM BEARING

[75] Inventor: Josef Schwarz, Balingen/Wurttemberg, Germany

[73] Assignee: Bizerba-Werke Wilhelm Krant KG, Balingen/Wurtt, Germany

[22] Filed: Sept. 11, 1973

[21] Appl. No.: 396,191

[30] Foreign Application Priority Data
Sept. 12, 1972   Germany.......................... 2244639

[52] U.S. Cl................. 177/261, 177/DIG. 9, 308/2
[51] Int. Cl....................... G01g 21/08, F16c 11/00
[58] Field of Search ........... 177/261, DIG. 9; 308/2

[56] References Cited
UNITED STATES PATENTS
3,421,595   1/1969   Kuhnle et al. ................. 177/DIG. 9

*Primary Examiner*—George H. Miller, Jr.
*Attorney, Agent, or Firm*—Michael S. Stricker

[57] ABSTRACT

A balance lever of a weighing scale has a knife edge which rests on a seat so that the lever can pivot about a pivot axis defined by the knife edge. A rolling element is mounted on the balance lever and has a central axis about which it turns as the balance lever pivots. An adjusting arrangement permits the position of the rolling element to be adjusted transversely of the pivot axis until the axes coincide. A guide arrangement engages the rolling element at opposite sides of its central axis for preventing transverse movement of the rolling element and knife edge relative to the seat.

8 Claims, 5 Drawing Figures

SCALE BEAM BEARING

BACKGROUND OF THE INVENTION

The present invention relates generally to a weighing scale, and more particularly to a weighing scale having a balance lever provided with a knife edge which rests on a seat so that the balance lever can pivot about the knife edge.

It is known in the prior art, for instance from German Gebrauchsmuster 1 955 171 and German Patent No. 1,449,913, to provide a weighing scale wherein such a balance lever rests on a seat which may be either fixedly mounted or horizontally displaceable. A rolling element is mounted on the balance lever, either rigid with the same so it turns with it or rotatable relative to it, and has a central axis coincident with the pivot axis about which the balance lever pivots, that is the pivot axis that is defined by the knife edge. The rolling element is engaged by a guide means, the purpose of this arrangement being to ensure that as the balance lever pivots, it cannot become displaced transversely of the pivot axis defined by its knife edge.

The important requirement, namely that such transverse displacement be prevented is met by the prior-art arrangements. However, these arrangements present certain disadvantages in the assembly of the scale. In particular, the rolling element can be connected with the balance lever in only one predetermined position, and since the connection is rigid it will be appreciated that the inevitable tolerance variations which occur in the manufacture of the components to be connected will almost unavoidably cause deviations between the pivot axis defined by the knife edge and the central axis of the rolling element, as the components are assembled. If these two axes are not coincident, however, the result can be a binding of the rolling element with respect to the guide means, whereby the desired friction-free pivoting of the balance lever is disadvantageously influenced.

SUMMARY OF THE INVENTION

It is, accordingly, an object of the present invention to eliminate the aforementioned disadvantage.

More particularly, it is an object of the present invention to provide an improved weighing scale which is not possessed of this disadvantage.

Still more particularly it is an object of the present invention to provide, in a weighing scale of the type in question, a combination wherein the pivot axis defined by the knife edge and the central axis of the rolling element can be made to exactly coincide.

In keeping with these objects, and others which will become apparent, one feature of the invention resides, in a weighing scale, in a combination which briefly stated comprises a balance lever having a knife edge, and a seat on which the knife edge rests so that the balance lever can pivot about a pivot axis defined by the knife edge. A rolling element is mounted on the balance lever and has a central axis about which it turns as the balance lever pivots. Adjusting means is provided for adjusting the position of the rolling element transversely of the pivot axis until the axes coincide. Guide means is provided which engages the rolling element at opposite sides of the central axis for preventing transverse movement of the rolling element and knife edge relative to the seat.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
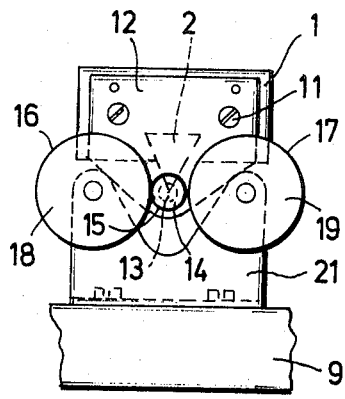
FIG. 1 is a fragmentary detail view illustrating the salient details of a weighing scale, as they pertain both to the prior art and to the present invention.
Figure 2:
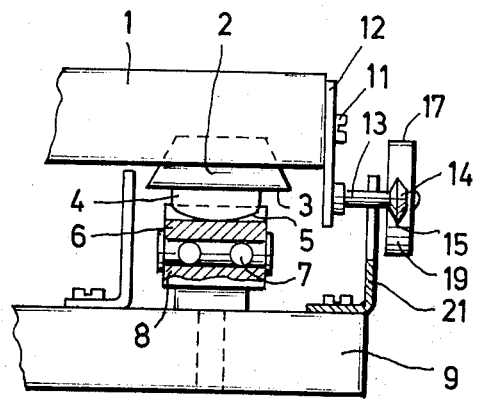
FIG. 2 is a partly sectioned side view of FIG. 1.
Figure 3:
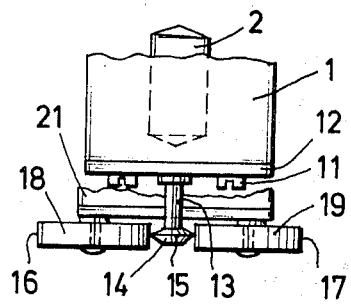
FIG. 3 is a top-plan view of FIGS. 1 and 2.

Referring firstly to FIGS. 1-3 it should be understood that these Figures illustrate those portions of a weighing scale which are of importance for an understanding of the present invention. The remaining portions of the scale have not been shown, being well known to those skilled in the art and being not necessary for an understanding of the present invention. The portions shown in FIGS. 1-3 are those which find use in the prior-art construction as well as in the constructions according to the present invention, with the exception of some specific components which will be pointed out and which, in the present invention, are replaced with the components which are illustrated and will be described in more detail with respect to FIGS. 4 and 5.

With this in mind, and now referring firstly to FIGS. 1-3, it will be seen that reference numeral 1 designates a balance lever of a scale; the balance lever being shown somewhat diagrammatically and fragmentarily. It is fixedly connected with a prismatic member 2 which is a knife edge balance member and which has a knife edge 3 facing downwardly and resting on the planar other side of a seat 4. In accordance with general practice, such balance levers 1 are provided with an additional knife edge balance 2 having a knife edge 3 which rests on a seat 4; however, for purposes of the present invention it is merely necessary to illustrate one of each.

The underside 5 of the seat 4 is of arcuate configuration (see FIG. 2) and rests on a carrier 6 on which it is rockable. The purpose is to assure that its planar upper side 4 can adjust itself to be exactly parallel to the knife edge 3. The carrier 6 is mounted by means of bearing balls 7 or similar elements on a support 8, so that it can shift on the support 8 within certain limits to compensate for movements of the knife edge balance 2 and the knife edge 3 thereof. The support 8 in turn is rigidly connected with the frame 9 of the scale.

One free end of the balance lever 1 has mounted on it a plate 12 by means of screws 11; an arm 13 projects from the plate 12 and carries at or near its free end a rolling element 14 in form of a circular plate having a circumferential edge 15. In accordance with the prior art, and this is the configuration and arrangement of the rolling element 14 which is shown in FIGS. 1–3, the rolling element 14 is of one piece with the arm 13. Its central axis coincides exactly with a longitudinal extension of the knife edge 3, that is with the pivot axis defined by the knife edge 3 and about which the knife edge balance 2 and the balance lever 1 can pivot. At its opposite lateral sides the rolling element 14 is engaged by the circumferential guide surfaces 16 and 17 of two guide rollers 18 and 19 which are turnably mounted on a support 21 which is also fixedly connected with the frame 9.

When the scale having this arrangement is used for weighing purposes, the balance lever 1 pivots about the pivot axis defined by the knife edge 3. During such pivoting the rolling element 14 turns about the extension of the knife edge 3 and rolls on the guide surfaces 16 and 17 which confine it against lateral movement, that is movement transversely of the axis about which it rotates. This prevents shifting of the knife edge 3 and the balance lever 1 relative to the seat 4 out of their predetermined position, in lateral direction.

Evidently, the turning of the rolling element 14 with reference to rollers 18 and 19 should encounter the least possible friction. This is possible in the construction of FIGS. 1–3 only if the rolling element 14 is exactly centered with respect to the pivot axis defined by the knife edge 3. This centering is carried out in the prior art in a special jig in which the vertical and lateral positions of the knife edge 3 and thus the knife edge balance 2 are precisely fixed and maintained in this manner, and in which abutments are provided for the rolling element 14 which permit the latter to be centered exactly to the pivot axis defined by the knife edge 3. When the balance lever 1 is mounted in this adjusting device, the screws 11 are not yet tightened so that the rolling element 14 which is of one piece with the arm 13 can freely shift to centered position to which it is urged by the aforementioned abutments of the jig. If, however, the screws 11 are subsequently tightened, then the rolling element 14 will necessarily be shifted out of its previously obtained centered position in certain circumstances, for instance if the free end face of the balance lever 1 on which the plate 12 is mounted does not extend exactly normal to the elongation of the knife edge 3. This means that the central axis of the rolling element 14 (and of the arm 13) now is inclined with respect to the pivot axis defined by the knife edge 3. When the balance lever 1 with its connected components is subsequently installed in the scale so that the knife edge 3 rests on the seat 4, the rolling element 14 which now becomes located between the rollers 18 and 19 will bind with respect to the guide surfaces 16 and 17 thereof, so that undesired high friction has to be overcome as the balance lever 1 pivots about the knife edge 3. This can be overcome by repeatedly readjusting the arrangement, loosening and tightening the screws 11, and in some instances it may be necessary to rework the free end face of the balance lever 1 on which the plate 12 is mounted, so as to make it exactly normal to the elongation of the knife edge 3. Evidently, this is time-consuming and, because of the labor involved, also expensive.

Figure 4:
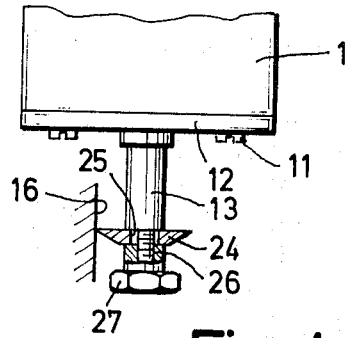
FIG. 4 is a partly sectioned top-plan view analogous to FIG. 3, but illustrating one embodiment of the present invention.
Figure 5:
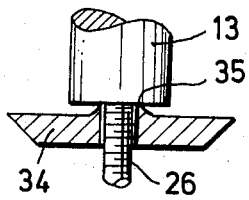
FIG. 5 is a partially sectioned fragmentary enlarged detail view, illustrating a further embodiment of the invention.

The present invention avoids these difficulties by utilizing the embodiment of FIG. 4 or the embodiment of FIG. 5. It is reiterated here that these embodiments make use of the basic construction shown in FIGS. 1–3, so that details of this construction need not be again illustrated in FIGS. 4 and 5.

Insofar as the embodiment of FIG. 4 is concerned, it will be seen that according to the present invention the rolling element 14 of the prior art —which is of one piece with the arm 13— is replaced by a separate rolling element 24 which can be adjusted with reference to the arm 13. Thus, the rolling element 24 can be adjusted even after the plate 12 have been rigidly connected with the balance lever 1 by means of the screws 11 or analogous components.

It will be seen that the arm 13 is provided at its free end with a reduced-diameter exteriorly threaded portion 26 (or with an exteriorly threaded projecting pin 26) whose diameter is smaller than that of the remainder of the arm 13. The discrete (i.e. separate) rolling element 24 is provided with a central bore 25 the inner diameter of which is relatively large and definitely larger than the outer diameter of the portion 26. The cross-sectional configuration of the rolling element 24 could be identical to that of the rolling element 14, if desired; it need not be the same as that which has been illustrated in FIG. 4.

The element 24 is pushed onto the portion 26 and a cap nut 27 is threaded onto the portion 26. As long as the cap nut 27 is not tightened, the rolling element 24 can be shifted transversely on the portion 26 until it is precisely centered with respect to the two guide surfaces 16 and 17 (only 16 shown) of the rollers 18 and 19 (compare FIG 3). In other words, it can be shifted until the central axis of the bore 25 is coincident with the pivot axis defined by the knife edge 3 (compare FIG. 2). Once this position is obtained and the rolling element 24 can roll with a minimum of friction in contact with the surfaces 16 and 17, the cap nut 27 is tightened to press the rolling element 24 against the larger-diameter portion of the arm 13 and hold it against further lateral displacement. A lacquer coating or similar material can be applied onto the components 24, 26 and 27, for instance after the nut 27 has been tightened, to prevent undesired loosening of the nut 27 and shifting of the rolling element 24.

The embodiment in FIG. 5 is used in the same circumstances and the same overall organization as FIG. 4, namely in an arrangement such as shown in FIGS. 1, 2 and 3. In FIG. 5, however, the rolling element 34 is somewhat different from the rolling element 24 of FIG. 4, in that one of its axial end faces (here the one which faces the larger-diameter portion of the arm 13) is provided with an axially projecting pointed annular bead 35 or with a plurality of non-annular pointed projections which at least frictionally engage the juxtaposed end face of the large-diameter portion of the arm 13 as the nut 27 is tightly and presses the rolling element 34 against the arm 13. Of course, depending upon the relative hardness of the projection 35 and the arm 13, the projection or projections 35 may also be actually pressed into the material of the arm 13. It is clear that the projection or projections 35 could also be provided on the opposite axial end face of the rolling element 34 and be pressed into the material of the cap nut 27, or into frictional engagement of the same, or that such projection or projections could be provided on the cap nut 27 or the arm 13, if desired. In any case, the provision of the projection or projections 35 in FIG. 5 assures an even more reliable retention of the rolling element 34 against undesired displacement in transverse direction once the cap nut 27 has been tightened.

It will be appreciated that the lacquer or similar material which has been mentioned before, can be applied in the embodiment of FIG. 5 also to prevent undesired loosening of the cap nut 27.

It will be understood that each of the elements described above, or two or more together, may also find a useful application in other types of constructions differing from the types described above.

While the invention has been illustrated and described as embodied in a weighing scale, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a weighing scale, a combination comprising a balance lever having a knife edge; a seat on which said knife edge rests so that said balance lever can pivot about a pivot axis defined by said knife edge; a rolling element mounted on said balance lever and having a central axis about which it turns as said balance lever pivots; adjusting means for adjusting the position of said rolling element transversely of said pivot axis until said axes coincide; and guide means engaging said rolling element at opposite sides of said central axis for preventing transverse movement of said rolling element and knife edge relative to said seat, said guide means comprising a pair of rollers mounted at opposite sides of said central axis for rotary movement about fixed axes which parallel said pivot axis.

2. A combination as defined in claim 1, said rolling element having a first circumferential surface which surrounds said central axis, and said rollers having respective second circumferential surfaces which each engage said first circumferential surface.

3. In a weighing scale, a combination comprising a balance lever having a knife edge and including an arm member which projects from it along said pivot axis and which has a main portion of greater and an exteriorly threaded free end portion of reduced diameter; a seat on which said knife edge rests so that said balance lever can pivot about a pivot axis defined by said knife edge; a rolling element mounted on said balance lever and having a central axis about which it turns as said balance lever pivots; adjusting means for adjusting the position of said rolling element transversely of said pivot axis until said axes coincide, said adjusting means including a central axial bore in said rolling element of a diameter greater than that of said free end portion of said arm, and a cap nut member threaded onto said free end portion and clamping said rolling element between itself and said main portion; and guide means engaging said rolling element at opposite sides of said central axis for preventing transverse movement of said rolling element and knife edge relative to said seat.

4. A combination as defined in claim 3, wherein said rolling element is of substantially disk-shaped outline.

5. A combination as defined in claim 3, wherein said rolling element has two axial faces one of which faces towards said main portion and the other of which faces toward said cap nut member; and projecting means provided on at least one of said members or faces and in at least frictionally anchoring engagement with the associated face or member, for preventing turning of said rolling element relative to said arm.

6. A combination as defined in claim 3, wherein said rolling element has two axial faces one of which faces toward said main portion and the other of which faces toward said cap nut member; and further comprising projecting means provided on one of said axial faces and engaging the associated one of said members in at least frictionally anchoring relationship, for preventing turning of said rolling element relative to said arm.

7. A combination as defined in claim 6, wherein said projecting means is provided on said one axial face.

8. A combination as defined in claim 6, wherein said projecting means is in form of an annular projection.

* * * * *

UNITED STATES PATENT OFFICE
CERTIFICATE OF CORRECTION

Patent No. 3 815 695     Dated June 11,1974

Inventor(s) J. SCHWARZ

It is certified that error appears in the above-identified patent and that said Letters Patent are hereby corrected as shown below:

In the heading of the patent "assignor to Bizerba-Werke Wilhelm Krant KG " should read --assignor to Bizerba-Werke Wilhelm Kraut KG --

Signed and sealed this 17th day of December 1974.

(SEAL)
Attest:

McCOY M. GIBSON JR.
Attesting Officer

C. MARSHALL DANN
Commissioner of Patents